(12) United States Patent
Culkin et al.

(10) Patent No.: US 8,289,203 B2
(45) Date of Patent: Oct. 16, 2012

(54) RADAR ARCHITECTURE

(75) Inventors: Daniel R. Culkin, Cazenovia, NY (US); Timothy D. Graham, Liverpool, NY (US)

(73) Assignee: SRC, Inc., North Syracuse, NY (US)

( * ) Notice: Subject to any disclaimer, the term of this patent is extended or adjusted under 35 U.S.C. 154(b) by 18 days.

(21) Appl. No.: 12/824,737

(22) Filed: Jun. 28, 2010

(65) Prior Publication Data
US 2010/0328157 A1 Dec. 30, 2010

Related U.S. Application Data

(60) Provisional application No. 61/220,749, filed on Jun. 26, 2009.

(51) Int. Cl.
*G01S 13/00* (2006.01)
(52) U.S. Cl. .......... 342/73; 342/81; 342/117; 342/154
(58) Field of Classification Search .............. 342/73, 342/81, 117, 154
See application file for complete search history.

(56) References Cited

U.S. PATENT DOCUMENTS

| 6,052,582 A * | 4/2000 | Blasing et al. ......... 455/562.1 |
| 2009/0079620 A1* | 3/2009 | Van Caekenberghe et al. .......... 342/200 |
| 2010/0033376 A1* | 2/2010 | Pozgay .......... 342/372 |

OTHER PUBLICATIONS

Li et al.; Transmit Subaperturing for MIMO Radars with Co-Located Antennas; IEEE Journal of Selected Topics in Signal Processing, vol. 4, No. 1, Feb. 2010, 55-65.

* cited by examiner

*Primary Examiner* — Timothy A Brainard
(74) *Attorney, Agent, or Firm* — George R. McGuire; Daniel P. Malley; Bond Schoeneck & King

(57) ABSTRACT

The present invention is directed to a radar system that includes an antenna array having a plurality of antenna elements and a plurality of transmit antenna phase centers. A transmitter portion is configured to transmit a plurality of transmit beams characterized by a transmit beam pattern. The transmit beam pattern has a predetermined transmit beamwidth that is a function of the number of orthogonal transmit waveforms. The number of orthogonal transmit waveforms is less than the plurality of antenna elements. A receiver portion is also coupled to the antenna array and is configured to extract a plurality of orthogonal receive signal components from a received signal provided by the antenna array. A plurality of extracted orthogonal receive signal components are digitally beam formed to implement a virtual antenna array and generate a receive signal having a receive beamwidth.

32 Claims, 9 Drawing Sheets

RADAR ARCHITECTURE

CROSS-REFERENCE TO RELATED APPLICATIONS

This application claims priority to U.S. Provisional Patent Application Ser. No. 61/220,749 filed on Jun. 26, 2009, the content of which is relied upon and incorporated herein by reference in its entirety.

BACKGROUND OF THE INVENTION

1. Field of the Invention

The present invention relates generally to the field of RF communication systems, and particularly to radar systems.

2. Technical Background

A radar is a system that uses electromagnetic waves to detect objects within a certain spatial volume. A radar system may be used to determine the range, altitude, direction, and/or speed of fixed objects, or objects that are moving through the spatial volume of interest. Radar systems have been used to identify and/or track various and disparate objects such as aircraft, ships, motor vehicles, weather formations, terrain and baseballs. The term "radar" is an acronym for "RAdio Detection And Ranging." As the name implies, a radar system transmits radio waves into the spatial volume referred to above. If and when a radio wave comes in contact with an object in space, the radio wave will be reflected and scattered by the object. Thus, a reflected signal is propagated back toward the radar system. The radar system receives the reflected radio wave and detects the object. Of course, a radar system is typically configured to transmit many radio pulses into the spatial volume every second. Each of these pulses are received and detected by the radar system. By comparing these pulses the radar system can determine if the object is moving, and if moving, its speed and direction.

The above discussion implies that a radar system includes several major parts, i.e., a transmitter, a receiver, and some sort of processing capabilities. One can further imagine that the transmitter and receiver employ an antenna to transmit the radio waves into space or to capture the radio waves propagating in space. The receiver is typically, but not always, disposed in the same location as the transmitter. A received reflected radar signal is usually very weak (indicating that the object is either small, a great distance from the receiver, or both) and must be amplified before it is processed. A radar system, therefore, is well suited to detect objects at great distances from the radar system and is useful in military, air traffic control, meteorology, automotive traffic control (i.e., speeding), etc.

In certain prior art radar systems, the antenna is rotated mechanically. The beam radiated by the antenna is propagated into space along the bore sight of the antenna. The spatial volume is, therefore, scanned by rotating the antenna, typically in a 360° sweep. One of the drawbacks of this approach relates to the cost and reliability of the mechanical equipment used to rotate the antenna. When ever a system uses moving parts, the system will ultimately wear out and break. Thus, the system must be maintained and replaced over time. The drawbacks associated with mechanically rotated radar antennas can be substantially obviated by the use of a phased array antenna.

A phased array radar antenna includes a plurality of antenna elements disposed in a two-dimensional array. These antenna elements are used for both transmission and detection of electromagnetic energy in an alternating fashion. A phased array radar system does not require moving parts, but may have them. For example, a planar array may be rotated mechanically to cover a required azimuthal range. However, a phased array radar does not require mechanical steering; it can be steered through phase shifting, or time delaying, signals to the various elements. In any event, a phased array radar beam is emitted by the plurality of elements using a principle known as superposition whereby the radio waves emitted by each element in the phase array are combined. Moreover, the amplitudes and phases of the radio waves constructively and destructively interfere with each other to create a composite radar beam having a predetermined radiation pattern. By continuously varying the amplitudes and phases of the radio waves being emitted from the various elements of the array, the composite radar beam may be pointed in a certain direction, or be made to scan back and forth (i.e., in azimuth) or up and down (i.e., in elevation). Thus, a phased array antenna propagates a single beam into the spatial volume and the reflected return signals are received by all of the elements in the phased array. Accordingly, a phased array radar system may be viewed as a single-input multiple output (SIMO) system because the antenna array transmits a single composite radar beam and the reflected signal is received by all of the elements in the phase array.

Recently, a multiple-input multiple-output (MIMO) radar architecture has been proposed. As its name suggests, a MIMO architecture employs multiple independent transmitters (i.e., inputs) and multiple receivers that are configured to take advantage of the geometry of the transmit and receive locations to increase target resolution. In some MIMO architectures, each transmitter may employ an omni-directional antenna having a gain equal to one (1). Since the transmitter is omni-directional with little gain, achieving a desired signal to noise ratio (SNR) on a given target requires a longer integration time, resulting in enhanced Doppler resolution. Further, if the multiple transmitter elements are to radiate at the same time, the set of transmit waveforms must be comprised of orthogonal waveforms. Time or frequency orthogonality are other ways to achieve orthogonality. From a mathematical perspective, two signals are "orthogonal" if their "dot product" is equal to zero. From a certain perspective, therefore, if two signals are orthogonal, it means that they are unrelated. Thus, a set of orthogonal signals includes signals that are unrelated to each other. Having each transmitter direct an orthogonal signal into the search volume allows each receiver to distinguish the transmission source of a received reflected signal. Thus, using a set of orthogonal signals is very useful. It should also be noted that the transmit antenna elements may have some gain or pattern in some MIMO schemes.

On the receive side, each receiver element may receive reflected signals generated by each transmitter and must be configured to accommodate each orthogonal signal. Each receiver channel, therefore, must include a matched filter for each orthogonal signal. A matched filter performs a mathematical function known as a cross-correlation whereby the received signal is convolved with one of the known orthogonal signals. If the received signal includes a version of the orthogonal signal (i.e., indicating that the received signal was generated by the orthogonal signal being reflected from a target in the spatial volume), the matched filter will indicate that it has detected a match between the transmitted signal and the received signal. As noted above, each receiver channel must include a matched filter for each orthogonal signal included in the set of transmitted orthogonal signals if it is to have the ability to detect them all.

To put it quite simply, the benefits and the drawbacks of the MIMO architecture are like two sides of the same coin. As noted above, the MIMO architecture individually filters and processes each received signal relative to each orthogonal signal prior to estimating the position of a target in the spatial volume. Because the MIMO architecture uses much more data in performing these calculations, it provides superior angle resolution and Doppler resolution vis a vis conventional coherent radar architectures. Superior angle resolution and Doppler resolution are typically touted as reasons why the MIMO architecture is superior to conventional coherent radar systems. The other side of the coin, i.e., the drawbacks associated with the MIMO architecture, relates to the increased processing requirements. In other words, implementing a MIMO system is challenging because of the intense processing requirements associated with MIMO architectures. The aforementioned processing requirements translate into cost, size, weight and power consumption realities that make MIMO architectures impractical to implement.

Moreover, providing extremely high transmit power from edge-located omni-directional transmit antennas in a volume search application is impractical. Omni-directional transmit antennas waste radar energy in portions of angle space that are not a part of the desired search volume. In addition, very long coherent integration times are not practical for the detection of a target with high Doppler shift due to range smearing during integration, unless range resolution is decreased significantly. This is not desirable for most volume search radars. As discussed above, a large MIMO array requires large numbers of simultaneous orthogonal transmit waveforms. An excessively large matched filter bank is required to process the waveforms and achieve a reasonable response from moving targets. Again, this requires a signal processor that has a very significant size, weight and cost, and one that consumes an inordinate amount of power.

What is needed, therefore, is a radar system that substantially eliminates the drawbacks associated with MIMO architectures while retaining the benefits. What is further needed is a radar system that is dynamically reconfigurable in real-time to search any desired volume. What is also needed is a radar system that incorporates MIMO features such that tradeoffs between detectability and accuracy are dynamically optimized in accordance with changing real-time mission requirements.

SUMMARY OF THE INVENTION

The present invention addresses the needs described above by providing a radar architecture that substantially eliminates the drawbacks associated with both conventional radar systems and MIMO systems while retaining the benefits. The present invention is directed to a radar system that is dynamically reconfigurable to search any desired volume in real-time. In doing so, the present invention optimizes the tradeoff between detectability and accuracy in accordance with real-time mission requirements.

One aspect of the present invention is directed to a radar system that includes an antenna array having a plurality of antenna elements and a plurality of transmit antenna phase centers. A transmitter portion is coupled to the antenna array. The transmitter portion is configured to transmit a plurality of transmit beams characterized by a transmit beam pattern. The transmit beam pattern has a predetermined transmit beamwidth that is a function of the number of orthogonal transmit waveforms. The predetermined transmit beamwidth substantially fills a predetermined angular volume. Each of the plurality of transmit beams includes a corresponding one of the plurality of orthogonal transmit waveforms. Each of the plurality of transmit beams is transmitted by a corresponding one of the plurality of transmit antenna phase centers. The number of orthogonal transmit waveforms is less than the plurality of antenna elements. A receiver portion is also coupled to the antenna array. The receiver portion is configured to extract a plurality of orthogonal receive signal components from a received signal provided by the antenna array. The plurality of orthogonal receive signal components corresponds to the plurality of orthogonal transmit waveforms. A plurality of extracted orthogonal receive signal components are digitally beam formed to implement a virtual antenna array and generate a receive signal having a receive beamwidth. The virtual antenna array includes a plurality of virtual antenna elements greater than the plurality of antenna elements. The receive beamwidth is a function of the plurality of virtual antenna elements.

In another aspect, is directed to a radar system that includes an antenna array including a plurality of antenna elements. A control portion is configured to process a command to search a predetermined angular volume. The control portion is configured to select a plurality of orthogonal transmit waveforms corresponding to a transmit beamwidth that substantially fills the predetermined angular volume. The control portion subdivides the antenna array into a plurality of transmit antenna subarrays, the number of transmit antenna subarrays equaling the number of orthogonal transmit waveforms. Each transmit antenna subarray includes a plurality of antenna elements. A transmitter portion is coupled to the antenna array. The transmitter portion is dynamically reconfigurable to transmit a plurality of transmit beams characterized by the transmit beam pattern. The number of the plurality of transmit beams equals the number of the plurality of orthogonal transmit waveforms. Each of the plurality of transmit beams is transmitted by one of the plurality of transmit antenna subarrays. A receiver portion is coupled to the antenna array. The receiver portion is dynamically reconfigurable to extract a plurality of orthogonal receive signal components from a received signal provided by the antenna array. The plurality of orthogonal receive signal component corresponds to the plurality of orthogonal transmit waveforms. The receiver portion is dynamically reconfigurable to beam form the plurality of orthogonal receive signal components extracted from the received signal to implement a virtual antenna array and generate a receive signal having a receive beamwidth. The virtual antenna array includes a plurality of virtual antenna elements greater than the plurality of antenna elements. The receive beamwidth is a function of the plurality of virtual antenna elements. In yet another aspect, is directed to a method for dynamically controlling a radar system in real time, the method includes the steps of: providing an antenna array including a plurality of antenna elements; providing a transmitter portion coupled to the antenna array; providing a receiver portion coupled to the antenna array; commanding the radar system to search a predetermined angular volume; selecting a plurality of orthogonal transmit waveforms corresponding to a transmit beamwidth that substantially fills the predetermined angular volume; subdividing the antenna array into a plurality of transmit antenna subarrays, the number of transmit antenna subarrays equaling the number of orthogonal transmit waveforms, each transmit antenna subarray including a plurality of antenna elements; dynamically reconfiguring the transmitter portion to thereby transmit a plurality of transmit beams characterized by the transmit beam pattern, the number of the plurality of transmit beams equaling the number of the plurality of orthogonal transmit waveforms, each of the plurality of transmit beams being transmitted by one of the plurality of transmit antenna subarrays; dynamically reconfiguring the receiver portion to extract a plurality of orthogonal receive signal components from a received signal provided by the antenna array, the plurality of orthogonal receive signal components corresponding to the plurality of orthogonal transmit waveforms; and dynamically reconfiguring the receiver portion to beam form the plurality of orthogonal receive signal components extracted from the received signal to implement a virtual antenna array and generate a receive signal having a receive beamwidth, the virtual antenna array including a plurality of virtual antenna elements greater than the plurality of antenna elements, the receive beamwidth being a function of the plurality of virtual antenna elements.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1A:
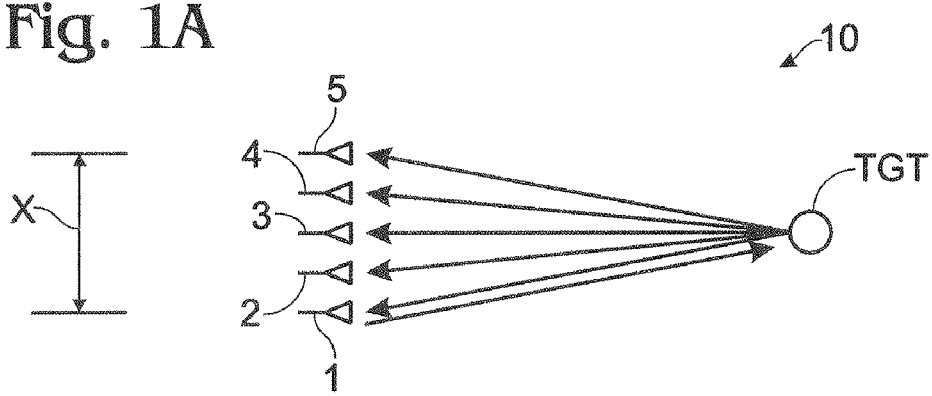
FIGS. 1A-1C provide a diagrammatic depiction of a virtual array in accordance with the present invention.

Reference will now be made in detail to the present embodiments of the invention, examples of which are illustrated in the accompanying drawings. Wherever possible, the same reference numbers will be used throughout the drawings to refer to the same or like parts. An illustrative embodiment of the radar architecture of the present invention is shown in FIG. 1, and is designated generally throughout by reference numeral 10.

Figure 1B:
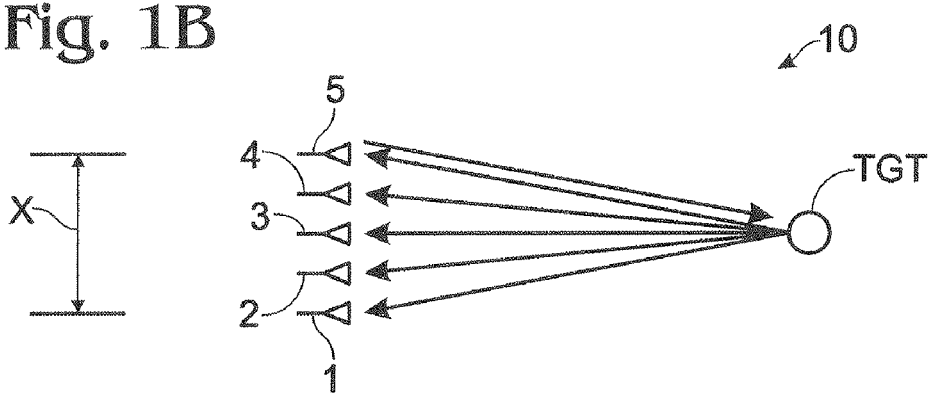
Figure 1C:
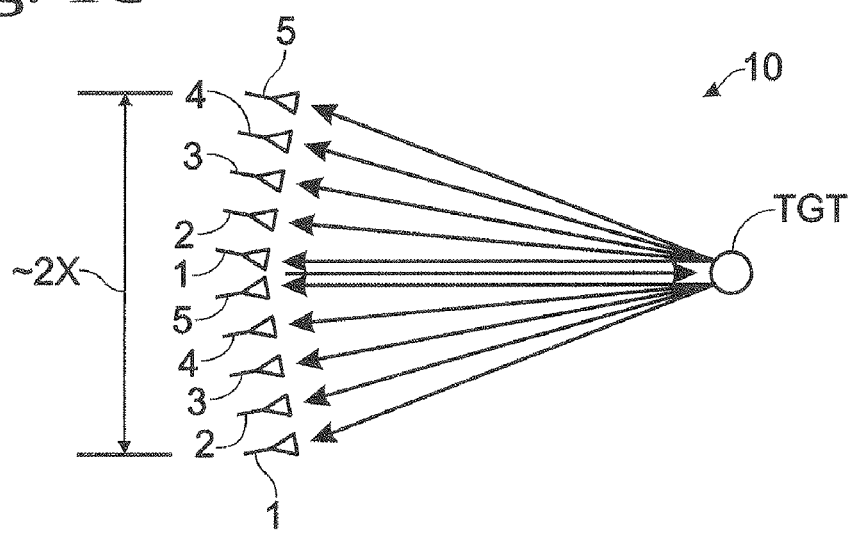

As embodied herein, and depicted in FIGS. 1A-1C, a diagrammatic depiction of a virtual array in accordance with the present invention is disclosed. FIGS. 1A-1C show a linear array of five antenna elements 1-5 and illustrates the benefit of using multiple transmit subarrays. In FIG. 1A, antenna element 1 is used as both a transmit phase center and a receive element. Antenna elements 2-5 are only used to receive. In FIG. 1B, antenna element 5 is used as both a transmit phase center and a receive element. Antenna elements 1-4 are only used to receive. If elements 1 and 5 transmit orthogonal waveforms, the virtual receive array shown in FIG. 1C is created. Note that the number of orthogonal waveforms is the number of unrelated waveforms simultaneously transmitted during the transmit portion of the radar cycle.

In the discussion that follows, it will be shown that the upper limit of a virtual array size shown for an N element linear array can be as high as (2N-1) in that dimension. When the orthogonal waveforms are processed jointly, the different transmit locations form a virtual antenna that is larger than the physical antenna used to capture the reflected energy during the receiver portion of the radar cycle. In other words, the present invention may be used to provide smaller beamwidths than would otherwise be possible if the transmit array included only one transmit phase center. On the other hand, the present invention introduces efficiencies that are not present in the MIMO architectures currently in vogue. As described in the background section, a MIMO architecture typically would use elements 1-5 for both transmit and receive functions. The present invention will clearly show that the marginal benefit of an additional transmit phase center often produces negligible benefits. The present invention, therefore, optimizes the accuracy of a predetermined search volume in light of processing constraints.

In both FIG. 1A and FIG. 1B the linear antenna array is a distance of "x" units. By selecting the transmit phase centers at either end of the array, the distance (x) between transmit phase centers (1, 5) is maximized. The virtual array shown in FIG. 1C is almost doubled to a distance of about "2x," and is nine elements wide. The geometric diversity of transmit phase centers 1 and 5 helps create the virtual array depicted in FIG. 1C. The geometric diversity of the transmit phase centers provides an accuracy advantage over conventional single transmitter schemes by providing a selected few transmit phase centers that dynamically create and/or reconfigure a virtual array in accordance with mission requirements. This provides the necessary accuracy in the most efficient manner. Thus, the virtual array size is not necessarily maximized (and usually does not need to be maximized), but what is gained is a radar system that represents a significant improvement over conventional radar systems from an accuracy standpoint while significantly reducing the processor size and complexity of proposed MIMO architectures.

It will be apparent to those of ordinary skill in the pertinent art that modifications and variations can be made to the antenna elements 1-5 shown in FIGS. 1A-1C, and described above, depending on a variety of factors. One or all of the antenna elements 1-5 may be implemented using any suitable antenna structures such as circular aperture antennas, linear or planar arrays of antennas, electronically steered antenna arrays, phased array antenna structures, etc.

Figure 2:
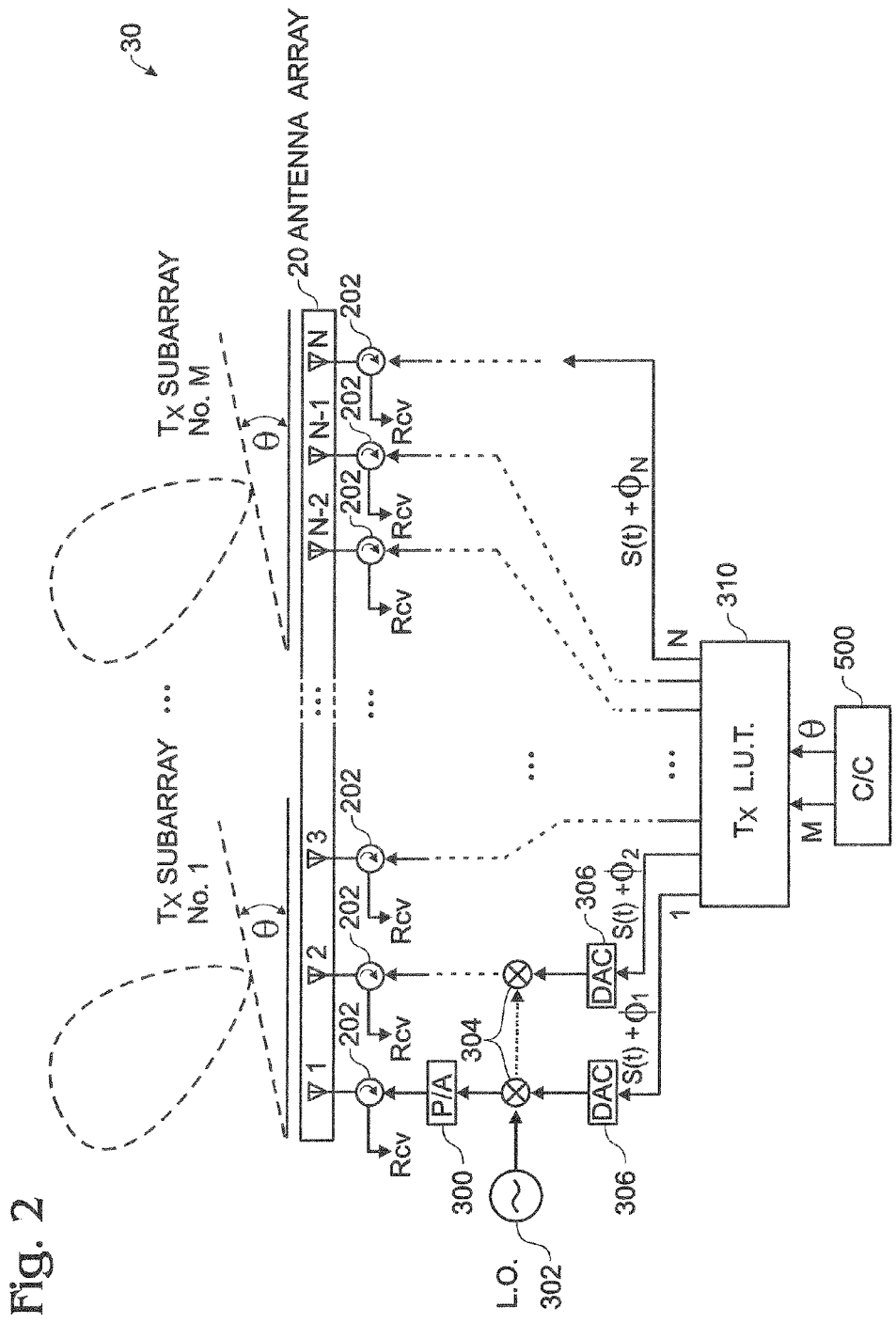
FIG. 2 is a block diagram of a transmitter portion of a radar system in accordance with another embodiment of the present invention.

As embodied herein and depicted in FIG. 2, a block diagram of a transmitter portion 30 of a radar system in accordance with another embodiment of the present invention is disclosed. In this example embodiment, the transmitter portion 30 is coupled to a phased array antenna 20 having antenna elements 1-N in the antenna array, N being an integer value. The antenna elements may be separated by a distance substantially equal to $\lambda/2$, where $\lambda$ is the wavelength associated with carrier frequency of the transmitted beam. The present invention is not to be construed as being limited to this value as other spacings may be employed. The gain of a radar antenna can be calculated as:

$$G = \frac{4\pi \cdot A_e}{\lambda^2},$$

where G is the gain of the antenna, $A_e$ is the effective aperture, and $\lambda$ is the wavelength of the antenna. The gain from the $i^{th}$ transmit subarray of the radar system is then:

$$G_i = \frac{4\pi \cdot M_x \cdot dx \cdot M_y \cdot dy \cdot \rho}{\lambda^2},$$

where $M_x$ is the number of elements in the X dimension of the subarray, $M_y$ is the number of elements in the Y dimension of the subarray, dx is the element spacing in the X dimension, dy is the element spacing in the Y dimension, and $\rho$ is the aperture efficiency of the system. M and N can be chosen to fill any sized angular volume substantially without any beam spoiling inefficiencies, allowing the radar system to efficiently search the desired volume while taking advantage of the increased Doppler resolution and angular accuracy inherent with the processing described above. The radar system of the present invention may be dynamically tuned to optimize energy management, sensitivity over a given search sector and receive angular resolution.

In any event, those of ordinary skill in the art will understand that antenna elements 1-N in phased array antenna 20 may be arranged using any suitable geometry including a linear phased array, a rectangular phased array, a planar array or any other suitable geometric phased array of antenna elements.

The command/control portion 500 of radar system 10 is configured to dynamically reconfigured the system 10 to include M transmit subarrays, where M is an integer value. Command/control circuit 500 provides, e.g., a look-up-table (LUT) 310 with the number of desired subarrays and the angular offset ($\theta$) of the transmitted wavefront. LUT 310 provides the appropriate set of N transmit waveforms for each antenna element (1-N) in response to receiving any value of M and $\theta$. Each transmit subarray coherently generates a single beam that includes one of the M orthogonal signals and is further characterized by a predetermined beamwidth and a predetermined angular wavefront offset ($\theta$).

Subsequently, each of the N-predetermined signals is directed to a corresponding digital to analog converter (DAC) 306. The analog baseband signal is upconverted by mixer 304. The local oscillator 302 provides the mixer 304 with the appropriate RF frequency. The mixer modulates the baseband signal and the RF signal is amplified by power amplifier 300. The amplified RF signal is directed to its corresponding antenna element (1-N) via circulator 202. Practically speaking, the number of subarrays M is typically less than or equal to N/2 if the beam radiated by the subarray is to have any gain or directivity.

Again, the beamwidth and gain of the transmitted beam is determined by the number of elements in the subarray, which in turn, determines the number of transmit subarrays M and the number of orthogonal beams. In the illustrative diagram of FIG. 2, only the first transmit channel associated with antenna element 1 is fully shown. The diagrammatic depiction for each transmit channel for elements 2-N is omitted for the sake of brevity. Those of ordinary skill in the art will also understand that the principles of the present invention should not be construed as being limited to the embodiment depicted in FIG. 2.

Figure 3:
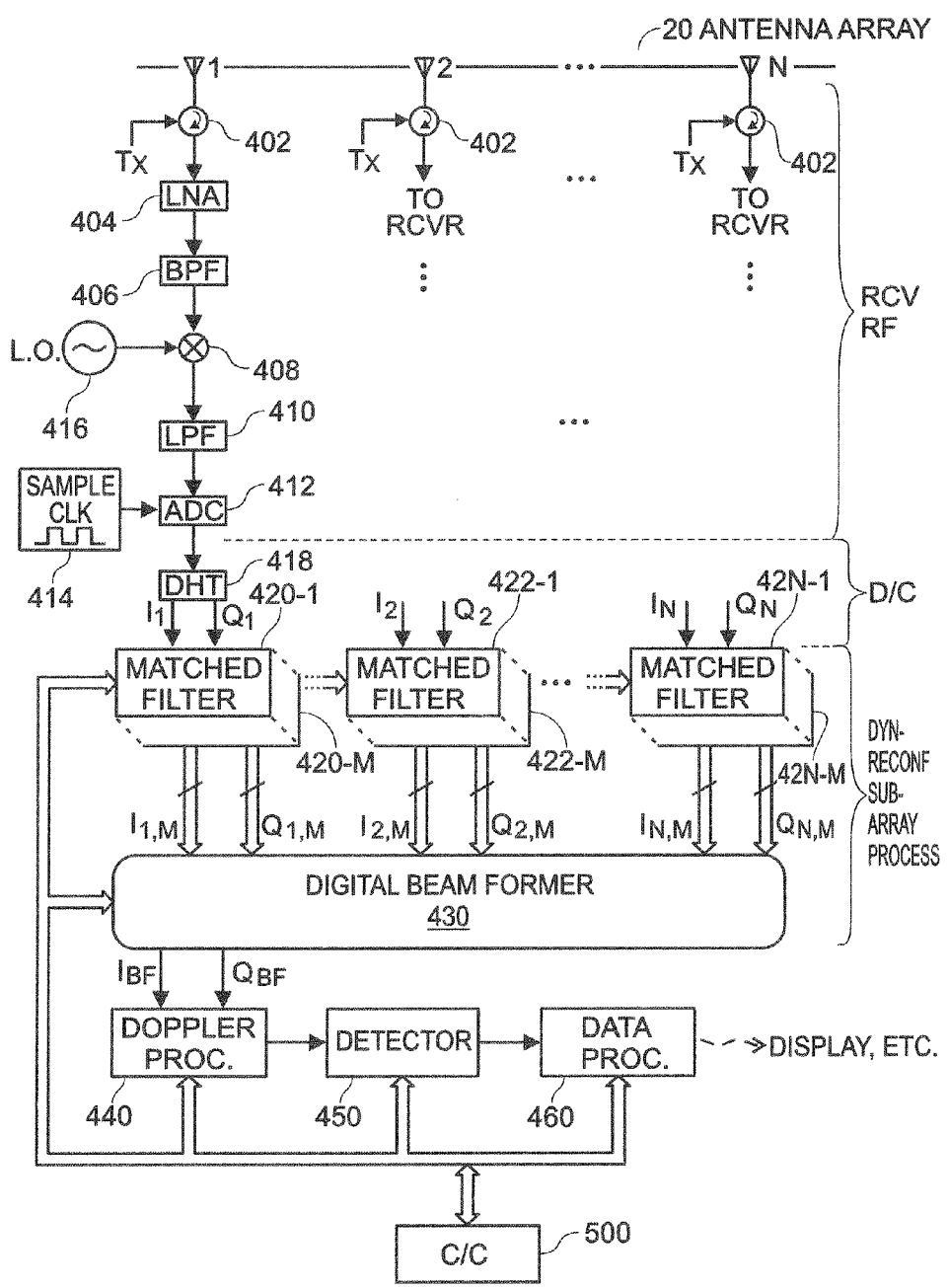
FIG. 3 is a block diagram of a receiver portion of a radar system in accordance with the embodiment depicted in FIG. 2.

As embodied herein and depicted in FIG. 3, a block diagram of a receiver portion of a radar system in accordance with the embodiment depicted in FIG. 2 is disclosed. Thus, the antenna 20 includes antenna elements 1-N. As before, the antenna element 1 is connected to circulator device 202. The received energy is thereby directed to low noise amplifier 404. The amplified received signal is then directed to bandpass filter 406. The filtered RF signal is downconverted by mixer 408 whereby the filtered RF signal is multiplied by an appropriate signal provided by local oscillator 416. The downconverted signal is directed to low pass filter 410 which removes unwanted harmonics from the received analog baseband signal. Next, the analog signal is converted into a baseband digital signal by analog-to-digital converter (ADC) 412. ADC 412 provides discrete digital samples of the received signal in accordance with the sampling clock 414. Those of ordinary skill in the art will understand the same operations described above relative to the first receive channel are also being performed in parallel by receive channels 2-N. Thus, there are N digital baseband samples being generated during every sampling clock period. It should also be mentioned at this point that all timing components such as clocks and oscillators in both the transmitter and receiver are derived from the same timing source such that system 10 is phase coherent.

Each digital baseband signal is directed into a digital Hilbert transform, which is typically implemented in software. As those of ordinary skill in the art will appreciate, the Hilbert transform is employed to shift a given signal by +/−90 degrees. Thus, the output of DHT 418 provides the in-phase component i[n] and the quadrature component q[n] for a given signal sample r[n]. Thus, a quadrature version of the signal sample r[n] is provided to the matched filter 420 in the rectangular form r[n]=i[n]+jq[n]. Those skilled in the art will understand that the quadrature signal may also be expressed as r[n]=M exp (j$\phi$), where M is the square root of the sum of the square of i[n] and q[n]. This is mentioned because the quadrature signals i[n] and q[n] provide important phase information that is utilized in both the matched filters and the beam former 430.

The matched filter bank for channel one (1) is shown to include matched filters [420-1, 420-2 . . . 420-M]. Thus, when the command/control portion 500 provides LUT 310 (see FIG. 2) with parameter M, it also dynamically reconfigures the receiver 40 by providing a predetermined orthogonal transmit signal to matched filter 420-1, a second predetermined orthogonal transmit signal to matched filter 420-2, and so on and so forth. Thus, the matched filter bank for every channel (1-N) must include a matched filter for each one of the M-orthogonal signals. As those of ordinary skill in the art will appreciate, a matched filter performs a cross-correlation of the orthogonal signal and the received signal sample. If a time delayed and attenuated version of the orthogonal signal is present in the received signal, the matched filter output is at a maximum. If a time delayed and attenuated version of the orthogonal signal is not present in the received signal, the cross-correlation yields a smaller value (e.g., there is noise in the received signal). In particular, if a signal is present, there is a matched filter gain of (pulse width)×(bandwidth) out of the matched filter. Thus, e.g., a 10 microsecond pulse having a 20 MHz bandwidth will receive 23 dB more gain out of the matched filter than a random noise signal. As shown in the drawing, the matched filter bank for each channel (1-N) will provide an in-phase vector $I_{(1-N), M}$ and a quadrature-phase vector $Q_{(1-N), M}$ based on the received signals provided by antenna elements 1-N.

In the next processing step, the digital beam former 430 will receive N-I and Q vectors from the N matched filter banks, N being an integer. The digital beam former 430 is configured to multiply each in-phase and quadrature pair with an appropriate complex weighting function $a_k \exp(j\phi_k)$. The amplitude and phase of each antenna element are controlled by the complex weighting function for a variety of reasons. If a detected target is spatially offset from the center bore of the radiated beam, for example, the digital beam former 430 will make the necessary adjustments. The beam former 430 may also be employed to adjust the level of signal sidelobes, etc. In any event, the matched filter banks in the previous processing stage provide the beam former 430 with the data from M virtual radars that are spatially offset from each other. The geometry provided by the transmit subarrays enable the beam former 430 to provide significantly improved accuracy.

Figure 4:
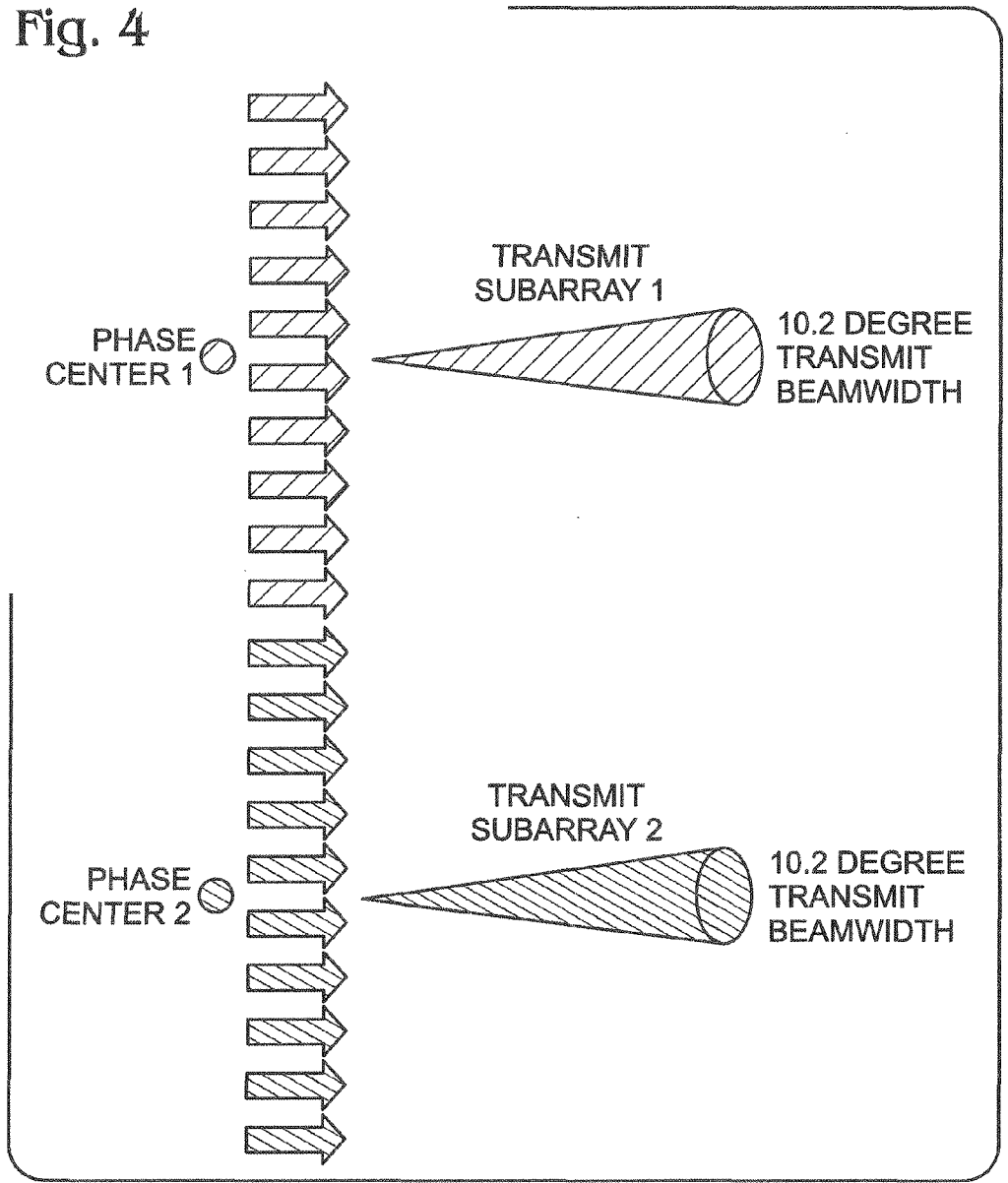
FIG. 4 is a diagrammatic depiction of a transmit array in accordance with an embodiment of the present invention.

To be clear (as shown in FIG. 4), the digital beam former performs its function before a target is detected. Generally the beam locations, and hence the weighting function, are chosen in one of two ways. In the first way, the beam former may execute a pre-determined order of beam positions with the hope of finding a target. In the second way, if there is a dedicated track, i.e., a target of interest has been previously detected, a receive beam may be steered to the exact location of the previously identified track with the hope of detecting it again. Both methods multiply each in-phase and quadrature pair with an appropriate complex weighting function $a_k \exp(j\phi_k)$.

The digital beam former 430, in turn, provides an in-phase and quadrature output to the Doppler processor 440. Doppler processor 440 uses the input samples from the beam former 430 to generate target velocity measurements and provides coherent gain by integrating returns from multiple pulses. The detector estimates the position of the target using a pre-determined statistical formula. The information generated by the processing elements of the receiver are directed to the data processor block 460 which, in turn, formulates the data for display and other such uses. As alluded to above, the command/control block 500 is also configured to adjust the weighted complex coefficients of the digital beam former 430 in response to inputs from Doppler processor 440 and detector 450.

The matched filter banks described above employ code orthogonal waveforms, i.e., intrapulse coding, but the present invention should be construed as being limited to this method. As those of ordinary skill in the art will appreciate, the main ways to achieve orthogonality are through intrapulse coding, time, frequency, and Doppler coding. In each method, the waveforms simultaneously transmitted by each subarray are orthogonally coded such that they may be identified by the matched filter. If time is employed, the sub-arrays are cycled through one Pulse Repetition Interval (PRI) at a time. The data is processed in a conventional manner for each subarray up until the beam former portion of the receiver. The data is stored in memory until all sub-arrays are completed, and then the beam is formed. If frequency orthogonal waveforms are employed (that is transmitting each waveform at a different RF frequency), the signal identification be done somewhere other than the matched filter, e.g., by using a bank of multiple DHT filters. This method would reduce the bandwidth through the processing chain by not requiring the full radiated bandwidth (including all multiple frequency orthogonal waveforms) to be processed by the matched filter. Thus, with each sub-arrays transmitting at a different RF frequency, the receiver is open (from a bandwidth perspective) to receive contributions from all transmitted waveforms. In this method, the waveforms are separated out either at the DHT or by the matched filter and then processed in the beam former. This method typically requires a beam former process that is slightly more complicated.

If Doppler coding is used, each sub-array waveform is transmitted with a different pulse-to-pulse phase shift. In this method, the Doppler processing is configured to isolate the sub-array waveforms.

Each of these methods have their own advantages and disadvantages, depending on the application. Each approach has implications with respect to the transmit hardware and receive architecture, and each approach also has an impact on the overall processing architecture. Irrespective of the means used to achieve orthogonality, the present invention is configured to optimize energy and adapt the processing architecture to different numbers of orthogonal sets.

With respect to the embodiments described in FIGS. 2 and 3, those of ordinary skill in the art will appreciate that the dynamically reconfigurable processing functions of the present invention, such as matched filtering, beamforming, etc., are typically implemented using a digital signal processor that employs random access memory (RAM), read only memory (ROM), I/O circuitry, and communication interface circuitry coupled together by a buss system. The buss typically provides data, address, and control lines between the digital signal processor and the other system components. Moreover, processor functions may be implemented using hardware, software, general purpose processors, signal processors, RISC computers, application specific integrated circuits (ASICs), field programmable gate array (FPGA) devices, customized integrated circuits and/or a combination thereof. Thus, embodiments of the present invention are not limited to any specific combination of hardware circuitry and/or software. Taken together, RAM and ROM may be referred to herein as "computer-readable media." Further, the term "computer-readable medium," as used herein, refers to any medium that participates in providing data and/or instructions to the processor for execution. For example, the computer-readable media employed herein may include any suitable memory device including SRAM, DRAM, NVRWM, PROM, EROM, E2PROM, Flash memory, memory cards, flash drives, or any suitable type of memory. Non-volatile media may also include, for example, optical or magnetic disks as well as the aforementioned memory devices.

Referring to FIG. 4, a diagrammatic depiction of a transmit array in accordance with an embodiment of the present invention is disclosed. Those skilled in the art use the term "beam spoiling" to describe the process of perturbing the magnitude and phase at the antenna element level to alter the phase front of the transmitted beam (see, e.g., angle θ shown in FIG. 2) as well as shape the transmitted beam to fit a desired search volume. As alluded to above, the means for beam spoiling in conventional radar systems are sub-optimal from a sensitivity perspective because losses are incurred as a side effect of shaping the radiated beam. On the other hand, MIMO systems may waste energy by transmitting omni-directionally into space outside the predetermined spatial volume. If a MIMO system is implemented to have a certain gain in a given spatial volume, it is not dynamically changeable in accordance with dynamic mission requirements. In the sub-array architecture of the present invention, the number of elements in a subarray can be configured to optimally fill the desired volume without incurring losses.

Using a phased array antenna, for example, the beamwidth of a radiated beam may calculated in accordance with the following expression: BW=102/N, where N is the number of antenna elements in the dimension that is being measured. Thus, if one requires a 10.2 degree beamwidth, then 10.2=102/N; N is, therefore, equal to ten (10). Thus, an array of 10 elements will provide the needed beamwidth and the twenty (20) element phased array antenna depicted in FIG. 4 is divided into two transmit subarrays that radiate beams having a 10.2 degree beamwidth. Each of the two radiated beams transmits an orthogonal signal in the manner previously described. Note that "N" may be different for azimuth and elevation. Moreover, one should also note that the formula for beamwidth is only true when element spacing is equal to $\lambda/2$, with $\lambda$ being the wavelength of the radiated beam. The element spacing is defined by the required off bore sight scan angle without the presence of grating lobes, and is given approximately by: Spacing=$\lambda/(1+\sin(\theta))$, where $\lambda$ is the wavelength and $\theta$ is the steering angle. This gives $\lambda/2$ for steering 90 degrees (which is the maximum possible), which is often used for rough order antenna sizing/performance. However, if the radar were only required to steer 30 degrees, the spacing could be simply equal to $\lambda$. When spaced differently, the formula for the beamwidth, i.e., BW=102/N (at bore sight) does not hold, and must be calculated. The formula for the beamwidth (in degrees), is approximately equal to $(0.886)(\lambda)/(N)(d)(\cos\alpha)$, where $\alpha$ is the off-bore sight scan angle, in radians.

Figure 5:
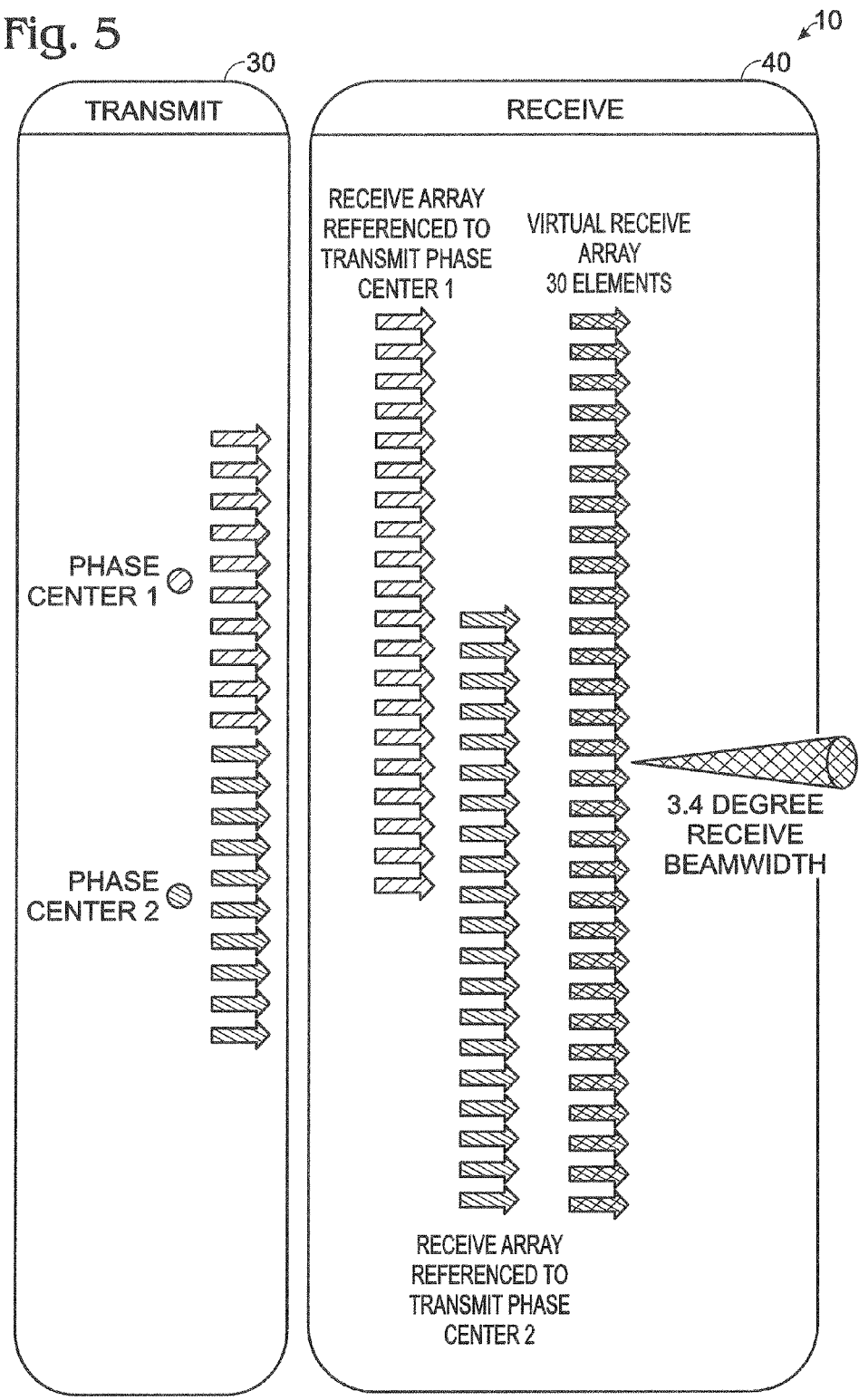
FIG. 5 is a diagrammatic depiction of the receiver system in accordance with the embodiment of FIG. 4.

Referring to FIG. 5, a diagrammatic depiction of the receiver system 40 in accordance with the transmitter 30 depicted in FIG. 4 is disclosed. Once again, the phased array antenna includes antenna elements separated by one-half wavelength ($\lambda/2$). The antenna outputs are characterized by uniform weighting. The size of the virtual array is equal to: VAS=2N−L, where as before, N is the number of elements in the antenna array, M is the number of transmit phase centers (i.e., the number of orthogonal waveforms) and L=N/M=20/2=10. Thus, the arrangement depicted in FIGS. 4-5 results in a VAS=2(20)−10=30. Using the Beamwidth Formula on the receive side we obtain BW=102/30=3.4 degrees (beamwidth). This clearly illustrates the improved accuracy of subarray architecture of the present invention.

Figure 6:
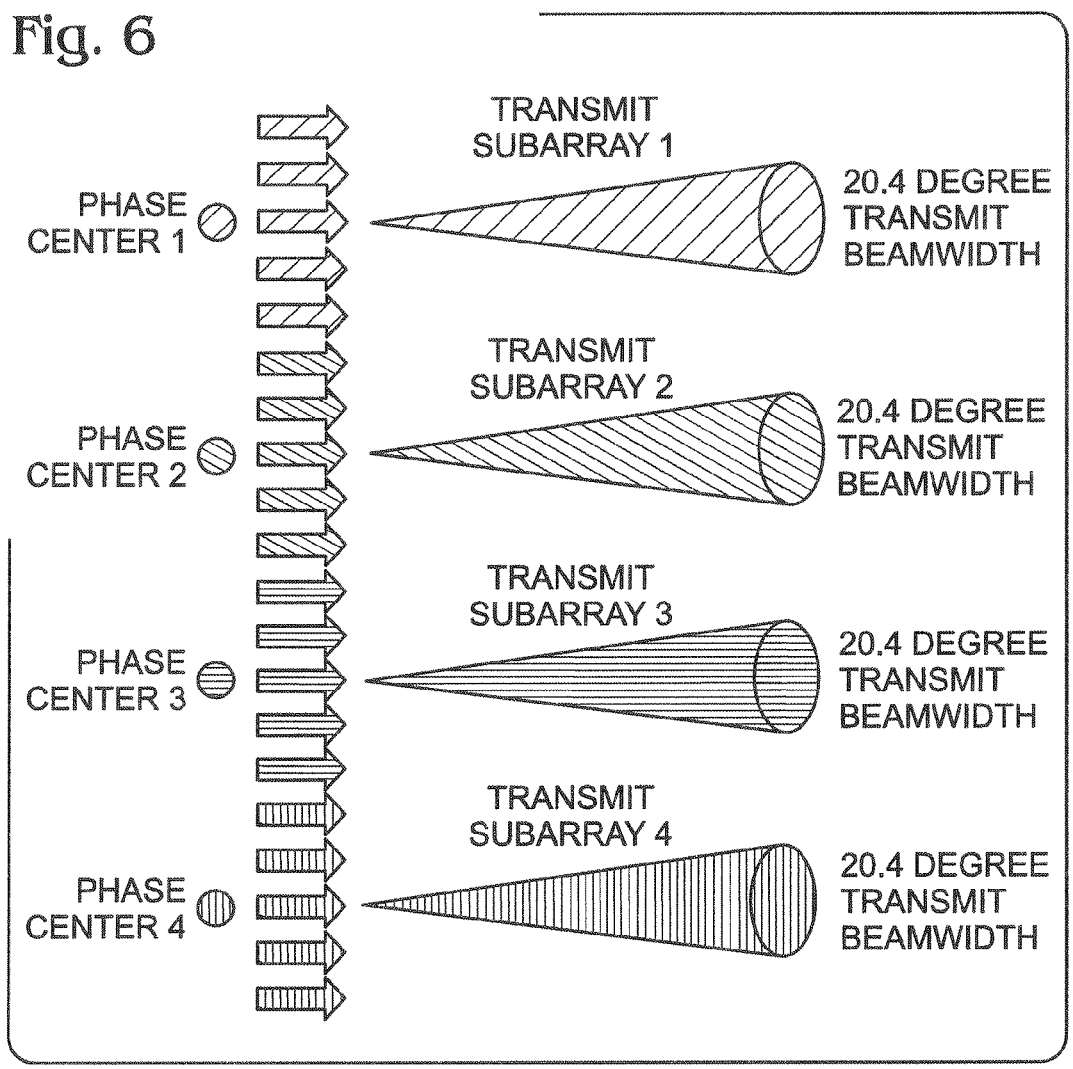
FIG. 6 is a diagrammatic depiction of a transmit array in accordance with yet another embodiment of the present invention.
Figure 7:
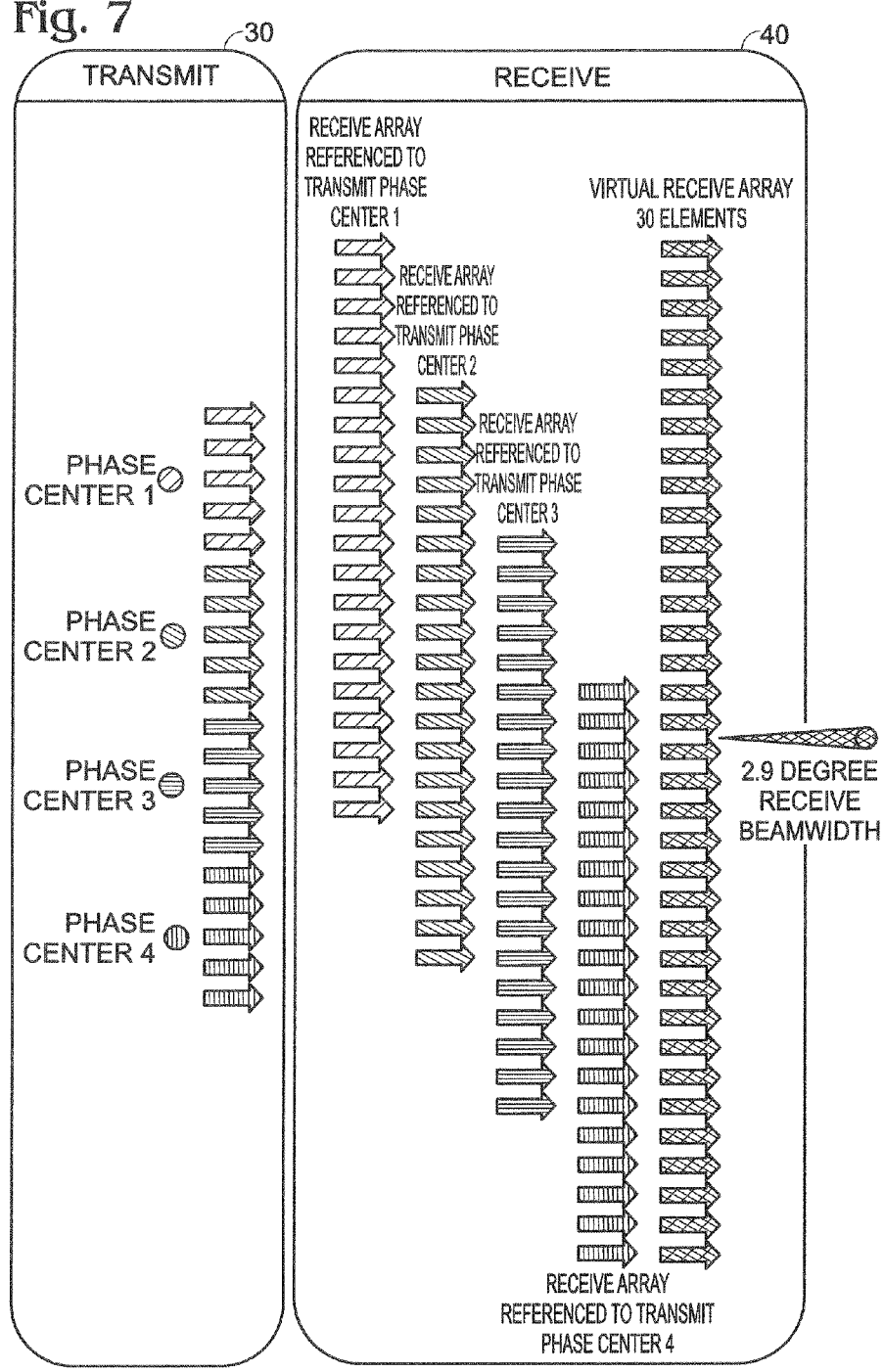
FIG. 7 is a diagrammatic depiction of the receiver system in accordance with the embodiment of FIG. 6.

Referring to FIGS. 6 and 7, another example of an energy management scheme in accordance with the present invention is provided. FIG. 6 is a diagrammatic depiction of a transmit array and shows that the required field of observation is 20 degrees. Using the formula BW=102/N, N is found to be equal to 102/20, or 5.1. Thus, the antenna array of 20 elements is divided into four phase centers of five (5) elements apiece. This yields four radiated transmit beams having a beamwidth of 20.4 degrees. Thus, very little energy is wasted. Most of the beamwidth of the four beams is directed into the desired search volume. With a minimal amount of beam spoiling, the efficiency is improved further.

FIG. 7 is a diagrammatic depiction of the receiver system. Again, the size of the virtual array is equal to: VAS=2N−L=40−20/4=35 elements. Using the beamwidth formula on the receive side we obtain BW=102/35=2.9 degrees (beamwidth). The received beamwidth represents a stunning improvement over conventional systems.

Figure 8:
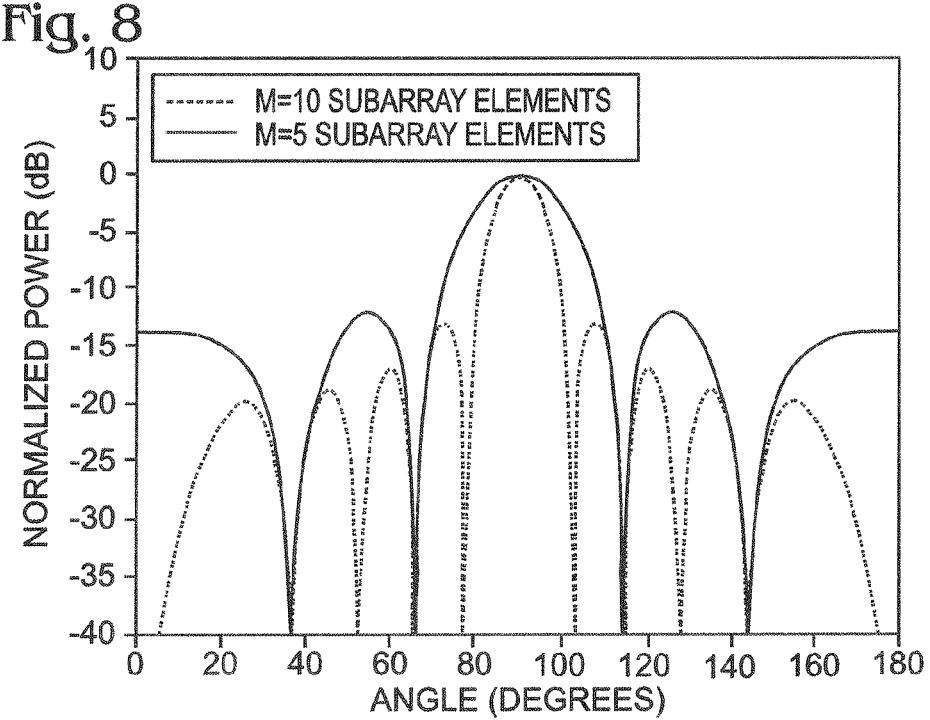
FIG. 8 is a plot showing the transmit beam patterns for the embodiments depicted in FIGS. 4-7.

FIG. 8 is a plot showing the transmit beam patterns for the embodiments depicted in FIGS. 4-7. In particular, the dashed line provides the normalized beam pattern for the 10.2 degree beamwidth (measured from the −3 dB points) of the embodiment of FIG. 4. The continuous plot provides the normalized beam pattern for the 20.4 degree beamwidth (measured from the −3 dB points) of the embodiment of FIG. 6.

Figure 9:
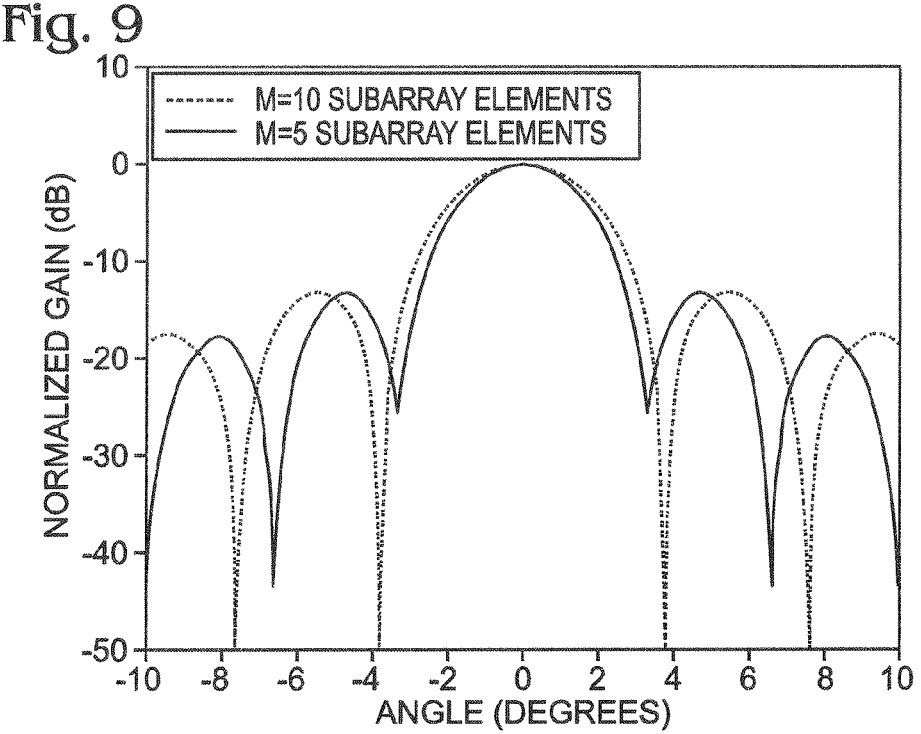
FIG. 9 is a plot showing the receive beam patterns for the embodiments depicted in FIGS. 4-7.

FIG. 9 is a plot showing the receive beam patterns for the embodiments depicted in FIGS. 4-7. The dashed line illustrates the 3.4 degree receive beamwidth of the embodiment of FIG. 5. The continuous line shows the 2.9 degree receive beamwidth of the embodiment of FIG. 7. Again, both measurements are taken at the −3 dB points of the respective curves.

The 2.9 degree beamwidth is slightly narrower than the 3.4 degree beamwidth because of the larger virtual array formed from the more widely separated transmit phase centers. These examples show uniformly spaced, non-overlapping subarrays. While the present invention is not restricted to non-overlapping subarrays, non-overlapping subarrays provide the largest benefit with respect to angular resolution because the phase centers on transmit are the most widely separated. On the other hand, an overlapping scheme where some elements transmit multiple waveforms simultaneously can be used to control the width of the receive beam by moving the location of the transmit phase centers. The exact number of elements and amount of overlap in a given subarray will depend on other desired parameters such as radiation pattern sidelobe levels, receive weighting schemes, and amount of digital processing capability of the system. One should also keep in mind that signal processing complexity rises with the number of transmit subarrays.

Based on the previous examples, Table 1 is provided below to illustrate the tradeoff between relative processor complexity and virtual array size using the 20 element linear array.

TABLE 1

|  | Sub-array Size (elements) | Number of Orthogonal Transmit Waveforms | Maximum Virtual Array Size (elements) | Normalized RCVD. Beamwidth | Processor Complexity Estimate |
|---|---|---|---|---|---|
| Conventional Radar | 20 | 1 | 20 | 1 | Conv. Radar Baseline |
|  | 10 | 2 | 30 | 0.67 | X 4 |
|  | 5 | 4 | 35 | 0.57 | X 8 |
|  | 4 | 5 | 36 | 0.56 | X 10 |
|  | 2 | 10 | 38 | 0.53 | X 20 |
|  | 1 | 20 | 39 | 0.51 | X 40 |

The maximum virtual array size, VAS=2N−L, where N is the number of elements in the antenna array and L is the number of antenna elements in the subarray.

Table I provides additional examples in tabular form to illustrate the various tradeoffs described above. One should immediately notice that the incremental improvement in virtual array size is the greatest from the first row (i.e., conventional radar) to the second row, where the number of orthogonal waveforms employed increases from one (1) to two (2). Similarly, the amount of decrease (0.33) in the normalized received beamwidth is greatest here as well. The normalized beamwidth gives the width of the beam formed divided by the beam formed using conventional processing. The estimate of processor complexity for this case is approximately four times (4×) the processing complexity of the conventional radar. The jump from two orthogonal waveforms to four orthogonal waveforms yields further improvements. The VAS increases by five elements to a total of 35 elements in the virtual array. The formed receive beamwidth is reduced another ten percent to about 0.57%. On the other hand, these improvements are offset by the doubling of processing complexity from 4× to 8×. The complexity estimate is based on number of operations for processing the received orthogonal waveforms.

Figure 10:
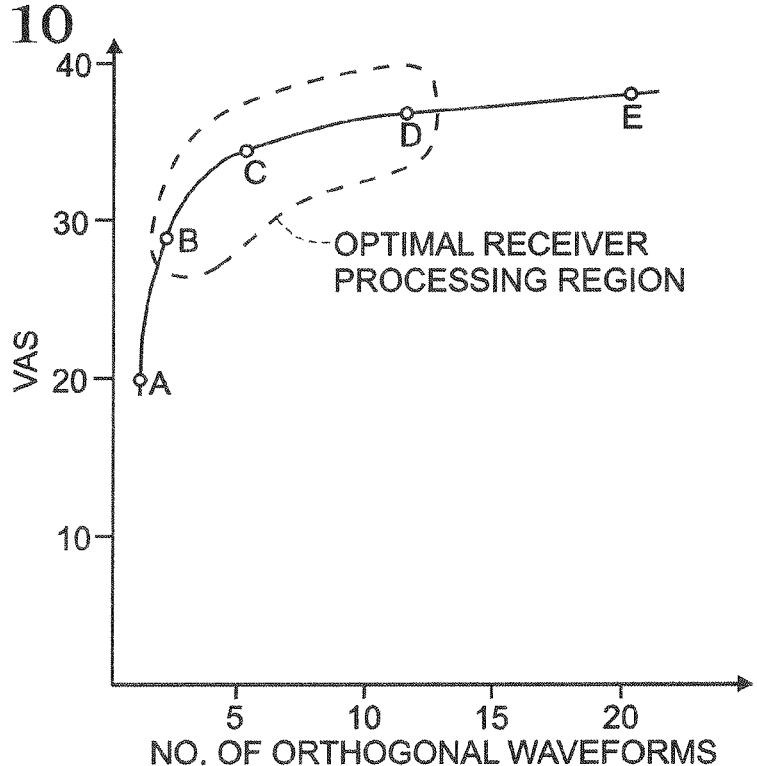
FIG. 10 is a plot illustrating the marginal benefit in virtual array size versus the number of system subarrays.

Referring to FIG. 10, a plot illustrating the marginal benefit in virtual array size versus the number of system subarrays is provided. The plot points in FIG. 10 are taken directly from Table I and are meant to illustrate the marginal benefits accrued by increasing the virtual array size. Ultimately, if one decreases the subarray size to one element, the present invention becomes an omni-directional MIMO radar. On one hand, the virtual array size vis a vis the four (4) orthogonal transmit waveform only increases from 35 elements to 39 elements. On the other hand, processing complexity increases from 8× to a whopping 40× the conventional radar processing baseline. Accordingly, the plot also identifies an optimal region of operation wherein the slope of the curve (VAS/No. of orthogonal waveforms) is approximately three or better. Of course the optimal region of operation must be determined for each system implementation.

When processing the returned signal, the major operations are pulse compression, digital beam forming, Doppler processing and detection. See, e.g., FIG. 3. In the MIMO example, every orthogonal waveform set must be pulse compressed against every other set during pulse compression. In comparison to conventional radar beam forming, because there are more pulse compression (i.e., matched filter) outputs, there are also more complex multiplication and addition operations required to form the beams that fill up the search volume. The present invention has no impact on Doppler processing and detection, and therefore, no additional calculations are necessary.

Figure 11:
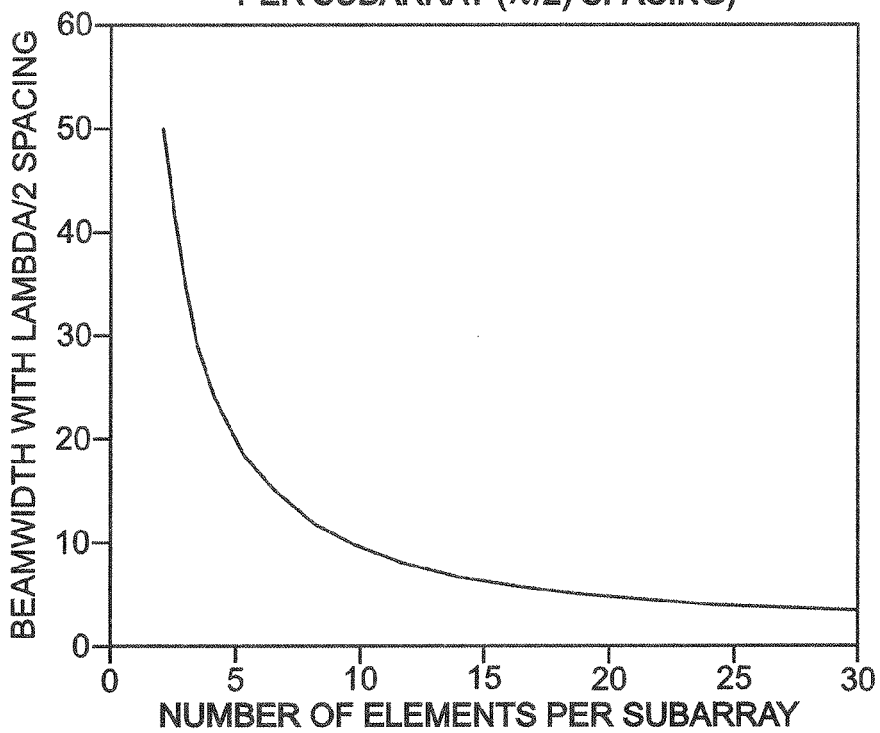
FIG. 11 is a plot illustrating the efficiency of the present invention in terms of transmit beam width with respect to subarray size.

Referring to FIG. 11, a plot illustrating the efficiency of the present invention in terms of transmit beam width as a function of subarray size is disclosed. With respect to quantifying the term "beam spoiling inefficiencies," the level of flexibility is determined by the number of elements in the array and the possible sub-array sizes. Thus, this is an application specific number. Since the sub-arrays could overlap, the number of elements in a subarray could be any integer value greater than one. So with λ/2 spacing, for example, with 5 elements, one would obtain 20.4 degree beamwidth, for 6 elements one would obtain 17 degrees, etc. For a given array, the number of subarrays will determine the number of orthogonal waveforms required. In practice, the method of the present invention would get the beam width as close as possible to the size of the spatial volume. The control system would then apply minor spoiling to provide the exact beamwidth. In contrast to the conventional art discussed herein, the methods of the present invention incur less loss than spoiling and weighting the entire array.

Compared to either conventional radar systems or the proposed MIMO techniques currently in vogue, the present invention provides almost the same angular resolution promised by MIMO using a processing complexity that is slightly more than the processing complexity of conventional radar. Moreover, the present invention provides the capability to tailor the radiated radar beam to any given volume. Thus, the present invention maximizes energy efficiency while minimizing processing requirements. As will be further appreciated, one embodiment of the present invention provides a phased array antenna array that is dynamically reconfigurable into antenna subarrays and employed in a volume search radar.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A radar system comprising:
an antenna array including a plurality of antenna elements and a plurality of transmit antenna phase centers;
a transmitter portion coupled to the antenna array, the transmitter portion being configured to transmit a plurality of transmit beams characterized by a transmit beam pattern, the transmit beam pattern having a predetermined transmit beamwidth that is a function of the number of orthogonal transmit waveforms, the predetermined transmit beamwidth substantially filling a predetermined angular volume, each of the plurality of transmit beams including a corresponding one of the plurality of orthogonal transmit waveforms, each of the plurality of transmit beams being transmitted by a corresponding one of the plurality of transmit antenna phase centers, the number of orthogonal transmit waveforms being less than the plurality of antenna elements; and a receiver portion coupled to the antenna array, the receiver portion being configured to extract a plurality of orthogonal receive signal components from a received signal provided by the antenna array, the plurality of orthogonal receive signal components corresponding to the plurality of orthogonal transmit waveforms, a plurality of extracted orthogonal receive signal components being digitally beam formed to implement a virtual antenna array and generate a receive signal having a receive beamwidth, the virtual antenna array including a plurality of virtual antenna elements greater than the plurality of antenna elements, the receive beamwidth being a function of the plurality of virtual antenna elements.

2. The system of claim 1, wherein the antenna array is a phased array antenna.

3. The system of claim 1, wherein the antenna array includes a plurality of transmit antenna subarrays, each of the plurality of transmit antenna subarrays corresponds to one of the plurality of transmit antenna phase centers.

4. The system of claim 3, wherein the gain of that antenna array is substantially equal to:

$$G = \frac{4\pi \cdot A_e}{\lambda^2},$$

wherein G is the gain of the antenna, $A_e$ is the effective aperture, and $\lambda$ is the wavelength of the antenna.

5. The system of claim 4, wherein a gain from an $i^{th}$ transmit subarray of the plurality of transmit antenna subarrays is substantially equal to:

$$G_i = \frac{4\pi \cdot M_x \cdot dx \cdot M_y \cdot dy \cdot \rho}{\lambda^2},$$

wherein $M_x$ is the number of elements in the X dimension of the subarray, $M_y$ is the number of elements in the Y dimension of the subarray, dx is the element spacing in the X dimension, dy is the element spacing in the Y dimension, and $\rho$ is the aperture efficiency of the system.

6. The system of claim 5, further comprising a control portion coupled to the transmit portion, the control portion being configured to select M and N, wherein M is the number of transmit subarrays and N is a set of transmit waveforms, such that the predetermined transmit beamwidth substantially fills a predetermined angular volume, whereby beam spoiling inefficiencies are less than a predetermined amount.

7. The system of claim 6, wherein the control portion is configured to dynamically select M and N in response to a dynamic selection of the predetermined angular volume.

8. The system of claim 3, wherein the virtual antenna array is characterized by a virtual array size substantially equal to 2N–L, where N is the number of elements in the antenna array and L is the number of antenna elements in the subarray.

9. The system of claim 3, wherein each transmit antenna subarray of the plurality of transmit antenna subarrays including a second plurality of antenna elements less than the first plurality of antenna elements.

10. The system of claim 1, further comprising a control portion coupled to the transmit portion and the receive portion, the control portion being configured to select the number of orthogonal transmit waveforms such that the predetermined transmit beamwidth substantially fills the predetermined angular volume.

11. The system of claim 10, wherein the receiver portion includes a plurality of receiver channels, each receiver channel corresponding to one of the plurality of antenna elements, each receiver channel including a matched filter bank, the matched filter bank being dynamically reconfigurable to include a matched filter corresponding to each orthogonal transmit waveform of the plurality of orthogonal transmit waveforms selected by the control portion.

12. The system of claim 11, wherein the receiver portion includes a digital beam former, the digital beam former being dynamically reconfigurable to accommodate the plurality of extracted orthogonal receive signal components corresponding to the plurality of orthogonal transmit waveforms selected by the control portion.

13. The system of claim 10, wherein the number of orthogonal transmit waveforms is less than or equal to one-half the number of antenna elements in the antenna array.

14. The system of claim 1, wherein the antenna array may be configured as a linear array of antenna elements or a two-dimensional array of antenna elements.

15. The system of claim 1, wherein the plurality of antenna elements are separated by a distance substantially equal to $\lambda/2$, where $\lambda$ is the wavelength associated with an RF frequency.

16. The system of claim 1, wherein the plurality of antenna elements include N antenna elements in a linear dimension of the antenna array, and wherein an upper size limit of the virtual antenna array in one dimension thereof is substantially equal to 2N–1.

17. The system of claim 1, wherein the plurality of orthogonal waveforms may be derived by intrapulse coding, time orthogonality, frequency orthogonality, or Doppler coding.

18. A radar system comprising:
an antenna array including a plurality of antenna elements;
a control portion configured to process a command to search a predetermined angular volume, the control portion being configured to select a plurality of orthogonal transmit waveforms corresponding to a transmit beamwidth that substantially fills the predetermined angular volume, the control portion subdividing the antenna array into a plurality of transmit antenna subarrays, the number of transmit antenna subarrays equaling the number of orthogonal transmit waveforms, each transmit antenna subarray including a plurality of antenna elements;
a transmitter portion coupled to the antenna array and the control portion, the transmitter portion being dynamically reconfigurable to transmit a plurality of transmit beams characterized by the transmit beam pattern, the number of the plurality of transmit beams equaling the number of the plurality of orthogonal transmit waveforms, each of the plurality of transmit beams being transmitted by one of the plurality of transmit antenna subarrays; and
a receiver portion coupled to the antenna array and the control portion, the receiver portion being dynamically reconfigurable to extract a plurality of orthogonal receive signal components from a received signal provided by the antenna array, the plurality of orthogonal receive signal components corresponding to the plurality of orthogonal transmit waveforms, the receiver portion being dynamically reconfigurable to beam form the plurality of orthogonal receive signal components extracted from the received signal to implement a virtual antenna array and generate a receive signal having a receive beamwidth, the virtual antenna array including a plurality of virtual antenna elements greater than the plurality of antenna elements, the receive beamwidth being a function of the plurality of virtual antenna elements.

19. The system of claim 18, wherein the antenna array is a phased array antenna.

20. The system of claim 18, wherein the gain of that antenna array is substantially equal to:

$$G = \frac{4\pi \cdot A_e}{\lambda^2},$$

wherein G is the gain of the antenna, $A_e$ is the effective aperture, and $\lambda$ is the wavelength of the antenna.

21. The system of claim 20, wherein a gain from an $i^{th}$ transmit subarray of the plurality of transmit antenna subarrays is substantially equal to:

$$G_i = \frac{4\pi \cdot M_x \cdot dx \cdot M_y \cdot dy \cdot \rho}{\lambda^2},$$

wherein $M_x$ is the number of elements in the X dimension of the subarray, $M_y$ is the number of elements in the Y dimension of the subarray, dx is the element spacing in the X dimension, dy is the element spacing in the Y dimension, and $\rho$ is the aperture efficiency of the system.

22. The system of claim 21, wherein the control portion is configured to select M and N, wherein M is the number of transmit subarrays and N is a set of transmit waveforms, such that the predetermined transmit beamwidth substantially fills a predetermined angular volume and wherein beam spoiling inefficiencies are less than a predetermined amount.

23. The system of claim 22, wherein the control portion is configured to dynamically select M and N in response to a dynamic selection of the predetermined angular volume.

24. The system of claim 18, wherein the virtual antenna array is characterized by a virtual array size substantially equal to 2N-L, where N is the number of elements in the antenna array and L is the number of antenna elements in the subarray.

25. The system of claim 18, wherein the receiver portion includes a plurality of receiver channels, each receiver channel corresponding to one of the plurality of antenna elements, each receiver channel including a matched filter bank, the matched filter bank being dynamically reconfigurable to include a matched filter corresponding to each orthogonal transmit waveform of the plurality of orthogonal transmit waveforms selected by the control portion.

26. The system of claim 25, wherein the receiver portion includes a digital beam former, the digital beam former being dynamically reconfigurable to accommodate the plurality of orthogonal receive signal components corresponding to the plurality of orthogonal transmit waveforms selected by the control portion.

27. The system of claim 18, wherein the number of orthogonal transmit waveforms is less than or equal to one-half the number of antenna elements in the antenna array.

28. The system of claim 18, wherein the antenna array may be configured as a linear array of antenna elements or a two-dimensional array of antenna elements.

29. The system of claim 18, wherein the plurality of antenna elements are separated by a distance substantially equal to $\lambda/2$, where $\lambda$ is the wavelength associated with an RF frequency.

30. The system of claim 18, wherein the plurality of antenna elements include N antenna elements in a linear dimension of the antenna array, and wherein an upper size limit of the virtual antenna array in one dimension thereof is substantially equal to 2N-1.

31. The system of claim 18, wherein the plurality of orthogonal waveforms may be derived by intrapulse coding, time orthogonality, frequency orthogonality, or Doppler coding.

32. A method for dynamically controlling a radar system in real time, the method comprising:
providing an antenna array including a plurality of antenna elements;
providing a transmitter portion coupled to the antenna array;
providing a receiver portion coupled to the antenna array;
commanding the radar system to search a predetermined angular volume;
selecting a plurality of orthogonal transmit waveforms corresponding to a transmit beamwidth that substantially fills the predetermined angular volume;
subdividing the antenna array into a plurality of transmit antenna subarrays, the number of transmit antenna subarrays equaling the number of orthogonal transmit waveforms, each transmit antenna subarray including a plurality of antenna elements;
dynamically reconfiguring the transmitter portion to thereby transmit a plurality of transmit beams characterized by the transmit beam pattern, the number of the plurality of transmit beams equaling the number of the plurality of orthogonal transmit waveforms, each of the plurality of transmit beams being transmitted by one of the plurality of transmit antenna subarrays;
dynamically reconfiguring the receiver portion to extract a plurality of orthogonal receive signal components from a received signal provided by the antenna array, the plurality of orthogonal receive signal components corresponding to the plurality of orthogonal transmit waveforms; and
dynamically reconfiguring the receiver portion to beam form the plurality of orthogonal receive signal components extracted from the received signal to implement a virtual antenna array and generate a receive signal having a receive beamwidth, the virtual antenna array including a plurality of virtual antenna elements greater than the plurality of antenna elements, the receive beamwidth being a function of the plurality of virtual antenna elements.

* * * * *